No. 629,979. Patented Aug. 1, 1899.
F. BOOKER.
ELECTRIC ARC LAMP.
(Application filed Feb. 28, 1899.)

(No Model.) 3 Sheets—Sheet 1.

WITNESSES:
Eela L. Giles

INVENTOR
Frederick Booker
BY
Richard
ATTORNEYS

No. 629,979. Patented Aug. 1, 1899.
F. BOOKER.
ELECTRIC ARC LAMP.
(Application filed Feb. 28, 1899.)
(No Model.) 3 Sheets—Sheet 3.

WITNESSES:
Ella L. Giles
Oldunnick

INVENTOR
Frederick Booker
BY Richardson
ATTORNEYS

THE NORRIS PETERS CO., PHOTO-LITHO., WASHINGTON, D. C.

UNITED STATES PATENT OFFICE.

FREDERICK BOOKER, OF LONDON, ENGLAND, ASSIGNOR OF ONE-HALF TO JULIUS PESCHEK, OF SAME PLACE.

ELECTRIC-ARC LAMP.

SPECIFICATION forming part of Letters Patent No. 629,979, dated August 1, 1899.

Application filed February 28, 1899. Serial No. 707,164. (No model.)

*To all whom it may concern:*

Be it known that I, FREDERICK BOOKER, a subject of the Queen of Great Britain and Ireland, and a resident of 19 Swallowfield road, Old Charlton, London, Kent county, England, have invented certain new and useful Improvements in Arc-Lamps, (for which I have made application for a patent in Great Britain, dated August 19, 1898,) of which the following is a specification.

This invention relates to electric lamps of that type in which the position of the carbons is regulated through the action of solenoids; and the object of the invention is to provide a brake operated by the solenoids which shall be exceedingly sensitive in its action and whereby the adjustment of the carbons in the lamp is automatically effected with greater precision than has been the case heretofore.

According to my invention I mount on the brake axle which carries the carbon-suspension drums a friction clutch or brake consisting of two preferably metal disks, one of which is fixed to the axle and flanged or recessed to receive the other, which is loose on the same axle and receives a screwing or combined rotary and axial movement from the solenoid-rocking lever, so as to grip and rotate in one direction the first-mentioned disk and the suspension-drums or to release same and allow the drums to rotate in the other direction and so adjust the feed of the carbons.

I will now refer to the accompanying drawings, in which—

Figure 1:
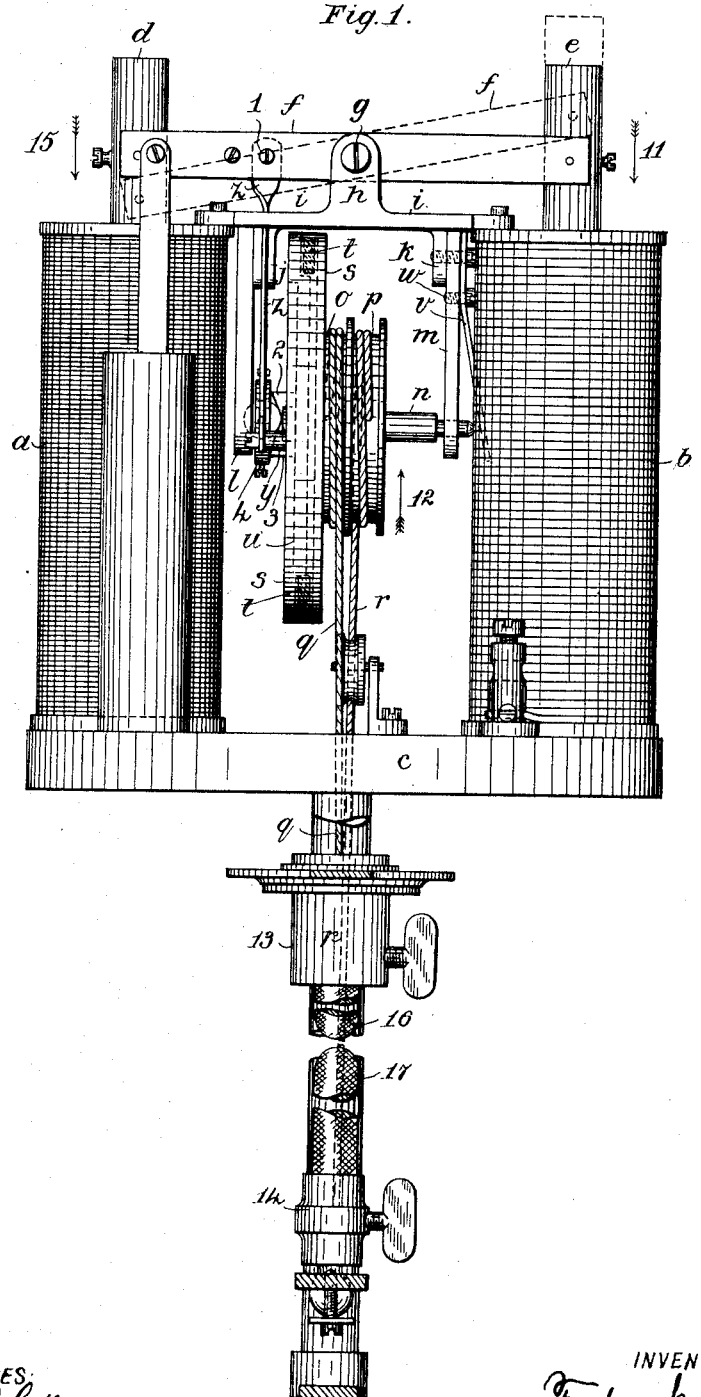
Figure 2:
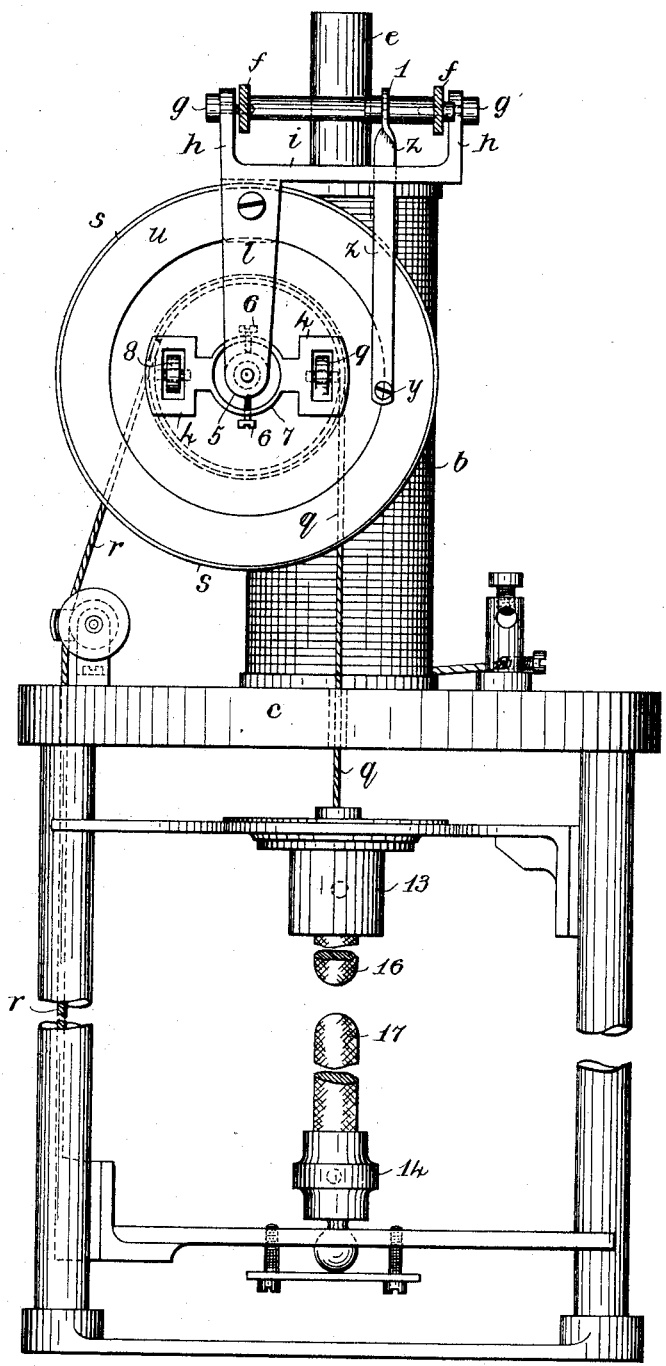
Figure 3:
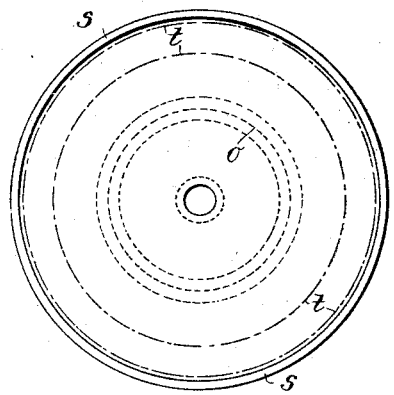
Figure 5:
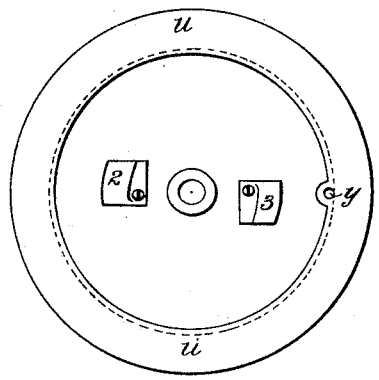
Figure 6:
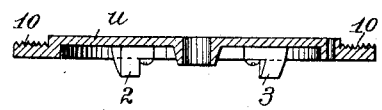
Figure 7:
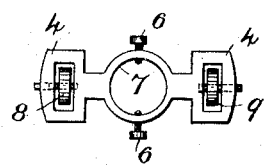
Figure 10:
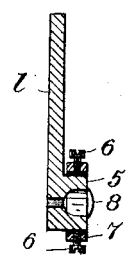
Figure 8:
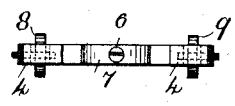
Figure 9:
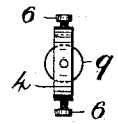

Figure 1 is a front elevation of an arc-lamp having my invention applied thereto. Fig. 2 is a side elevation of same with left-hand solenoid removed. Fig. 3 is a plan of the disk which is recessed and fixed upon the axle; and Fig. 4, a central section of same, showing the carbon-suspension drums attached thereto. Fig. 5 is a plan of the loose disk, and Fig. 6 a central section of same. Fig. 7 is a front elevation of the cross-armed plate hereinafter referred to. Fig. 8 is a plan, and Fig. 9 is an end view, of same. Fig. 10 is a sectional elevation of the supporting-arm and boss with the cross-armed plate mounted thereon.

$a$ is the shunt-wound, and $b$ the series-wound, solenoid, both mounted on the supporting-plate $c$. $d$ and $e$ are their respective cores, pivoted to the rocking lever $f$, which is fulcrumed at $g$ between the arms $h$ of the fixed bearing or bridge plate $i$. This arrangement of parts is well known and forms no part of my invention. The plate $i$ is provided with lugs $j\ k$, carrying vertically-depending arms $l\ m$, in which the brake-axle $n$ is mounted. The latter carries the two rotary carbon brake-drums $o\ p$, from which the upper and lower carbon carrying frames are suspended, respectively, by cords or chains $q\ r$. To the drums $o\ p$ is fixed the friction-disk $s$, which may be flanged, recessed, or flat. One form is shown separately in Figs. 3 and 4, wherein a rubber ring $t$ of any appropriate section, preferably square, is placed in the recess of the disk $s$. If a flat disk is employed, it may advantageously have a circular groove cut around its face to receive and hold the said friction-ring $t$. The second friction-disk $u$, Figs. 5 and 6, is of brass or other suitable material and is mounted loose upon the axle $n$ and adapted to pass into the recessed part of the disk $s$. It is arranged so as to be rotated and at the same time slid endwise on the axle $n$ and advanced and pressed against the rubber ring $t$ of the disk $s$ or moved away therefrom. The two disks $s$ and $u$ thus form a friction clutch or brake by which the movements of drums $o\ p$ are regulated. A spring $v$, with regulating-screw $w$, is provided and arranged to bear upon the end of axle $n$ for the purpose of taking up the endwise and screwing movement of the latter when the brake is applied and for returning all parts to normal position on its release.

Figure 4:
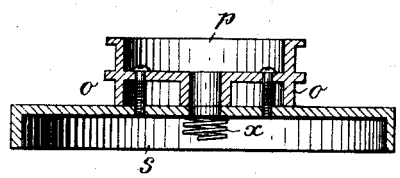

Normally the loose disk $s$ is kept away from the disk $u$ by the pressure of a small interposed spring $x$, Fig. 4, surrounding the axle $n$.

The loose disk $u$ is connected by a stud $y$ to a link $z$, pivoted at 1 to the rocking lever $f$, and is thus kept normally stationary until the said lever $f$ is moved by the action of the solenoids. A pair of inclined planes 2 and 3 are provided upon or fixed to the outer face of the disk $s$ and arranged diametrically opposite to each other—that is, with their inclined surfaces disposed in reverse directions, but in the same path and in the form of a portion of the pitch of a double-threaded screw. They are arranged in such manner as to simultaneously engage an abutment located in front of the disk $s$. The said abutment consists of a cross-armed plate 4, adjustably secured to a boss 5 on the depending arm $l$.

Referring now to Figs. 7, 8, 9, and 10, the plate 4 is secured to boss 5 by means of pointed set-screws 6, carried by a central ring-shaped part 7 of the plate 4, as shown, so that when properly adjusted the set-screw points enter indentations provided in the boss 5 for their reception. The ring-shaped part 7 is of somewhat larger diameter than the boss 5, and the plate is thus capable of a slight lateral motion in order to yield or adjust itself automatically to any small irregularity in the inclined planes 2 and 3 caused by wear or otherwise.

To prevent undue friction between plate 4 and inclined planes 2 and 3, antifriction-rollers 8 and 9 are provided and mounted on pins, as shown, and disposed near the ends of the plate 4, so as to be engaged by the inclines 2 and 3.

It is advantageous to form serrations, such as 10, on the inner bearing-surfaces of the loose disk $u$, and thus increase its gripping power on the rubber ring $t$.

I may of course reverse the above-described arrangement by forming the inclines on the plate 4 and mounting the antifriction-rollers in brackets or projections on the disk $u$ without departing from the nature of my invention.

The action of my improved brake is as follows: Assuming the lamp to be inert and the carbons in contact, when the current is switched on it passes through the series-solenoid $b$ (which is in the main circuit of the lamp) and draws its core $e$ inward, as is indicated by the arrow 11, thereby moving the rocking lever $f$ and raising the link $z$. This latter thereby imparts a slight rotary motion to the loose disk $t$, causing the inclined planes 2 and 3 to pass under and to engage the antifriction-rollers 8 and 9. This motion, when sufficiently continued, forces the disk $u$ inwardly against the rubber ring $t$ of disk $s$, compressing at the same time the interposed spring $x$. A gentle screwing action is thus exerted upon the rubber ring $t$ of disk $s$, and the friction thus engendered causes the said disk $s$, and consequently also the brake-drums $o$ $p$, fixed thereto, to participate in the motion of the loose disk $u$ and be rotated more or less in the direction indicated by the arrow 12, and thereby cause the connecting-cords $q$ $r$ to separate the carbons and strike the arc, the one, $q$, raising the carbon-carrier 13 and the other lowering the carbon-carrier 14 in the ordinary manner. The endwise push of the axle $n$ is counteracted by the spring $v$, which is capable of adjustment by the screw $w$ to suit varying conditions of current strength.

When the arc becomes too long, owing to consumption of the carbons, the attractive power of the shunt-coil $a$ predominates over that of the series-coil $b$ and draws the core $d$ inward, as indicated by the arrow 15, in opposition to the series-coil, thereby retiring the inclined planes 2 and 3 from under the rollers 8 and 9, when the internal compressed spring $x$ forces back the disk $u$ and reduces the pressure on the rubber ring $t$ until it is insufficient to sustain the normal weight of the carbon-carriers 13 and 14. Thus the brake is released and allows the drums $o$ $p$ to be rotated in an opposite direction to the arrow 12 by the pull of the heavier carbon-carrier 13, so drawing the carbons 16 and 17 together and reëstablishing the proper length of the arc. When the strength of the shunt-solenoid becomes reduced below that of the series-solenoid, further movement of the carbons is retarded.

The screwing motion of the improved brake arrangement, both in applying and in releasing the brake, is so gradual and sensitive that any abrupt movements are prevented and a regular and even feed is insured.

Having now described my invention, what I claim as new, and desire to secure by Letters Patent, is—

1. In electric-arc lamps the combination of the carbon-suspension drum, the shaft $n$ carrying the same in fixed relation thereto, a disk $s$ fixed to the suspension-drum, a loose part $u$ on said shaft, having inclined planes thereon and arranged to engage the disk $s$ the cross-armed plate 4 carrying means for engaging the inclines, the solenoid and connections therefrom to the cross-armed plate and the adjustable spring $v$ for pressing the shaft $n$ longitudinally, substantially as described.

2. A brake for electric-arc lamps comprising the combination of the regulating-solenoids with a part fixed to the carbon-suspension drums and their axle, a part loose upon said axle and rotated by the solenoids inclined planes on the said loose part coöperating with antifriction-rollers carried by an adjustable abutment in such manner that the rotary motion of the loose part $u$ is gradually imparted to the other part $s$ and to the carbon-suspension drums and by them through suitable connections to the carbon-carriers substantially as described.

3. A brake for electric-arc lamps comprising the combination of a disk $s$ rigidly connected to the rotary carbon-suspension drums and their axle, an adjustable spring $v$ controlling the endwise movement of the axle, a friction-ring $t$, a spring-pressed disk loose on the said axle and connected to and receiving a rotary motion from the rocking lever $f$ of the solenoids $a$ and $b$ by a link $z$ the inclined planes 2 and 3 upon said loose disk, and the cross-armed plate 4 with antifriction-rollers 8 and 9 adapted to be engaged by the said inclined planes on the rotation of the loose disk, all arranged and adapted to operate substantially in the manner and for the purposes set forth.

4. In a brake mechanism of the kind described for electric-arc lamps the combination with the loose friction-disk $u$ of an abutment-plate $l$, a boss 5 on the latter and a cross-armed plate 4 having a central ring-shaped part and set-screws engaging indentations on said boss, substantially as and for the purposes set forth.

In witness whereof I have hereunto signed my name in the presence of two subscribing witnesses.

FREDERICK BOOKER.

Witnesses:
 HENRY A. PRYOR,
 HENRY HART.